UNITED STATES PATENT OFFICE.

LYMAN DEE PETTIT, OF ST. JOSEPH, MICHIGAN.

LUBRICATING COMPOUND.

1,222,128.   Specification of Letters Patent.   Patented Apr. 10, 1917.

No Drawing.   Application filed September 18, 1916.   Serial No. 120,851.

*To all whom it may concern:*

Be it known that I, LYMAN DEE PETTIT, a citizen of the United States of America, residing at St. Joseph, in the county of Berrien and State of Michigan, have invented certain new and useful Improvements in Lubricating Compounds, of which the following is a specification.

My invention relates to certain new and useful improvements in lubricating compounds particularly adapted for use in connection with steam engines and the like.

The object of my invention is to provide a lubricating compound which will prevent or at least reduce the possibility of the occurrence of hot-boxes and also to greatly diminish friction of the working parts of machinery.

In my prior Patent No. 1143724 I have described a lubricating compound composed of crude petroleum oil, lime water, resin, graphite, paraffin wax, kerosene and red engine oil mixed in certain proportions. While good results were obtained with this compound I have discovered by extensive experiments that my earlier product can be greatly improved by varying the proportions stated in the prior patent and by substituting refined petroleum as a base for the crude petroleum oil of patent. I have also found that it is necessary to first subject the red engine oil to a preliminary heating operation before adding it to the other ingredients and to then raise the temperature of the mass as the other ingredients are added. The heating operations are of prime importance in that they facilitate certain chemical reactions thereby causing the various constituents of the compound to form a compact mass which time will not deteriorate.

The present compound is composed of the following ingredients in the proportions stated: refined petroleum, 42 parts; lime water, 36 parts; a mixture of resin 100 pounds, 5 gallons of kerosene and 3 gallons of red engine oil, 16 parts; a mixture of 50 pounds of graphite and 2 gallons of red engine oil, 3 parts; a mixture of one gallon of kerosene and 50 pounds of paraffin wax, 3 parts. When mixed in the proportions stated these ingredients form a highly efficient lubricant and one which, by reason of its resistance to the deteriorating effects of wide changes in temperature is particularly adapted for use in preventing hot boxes on steam engines and the like.

In practice, an amount of refined petroleum oil (for instance 21 gals.) is placed in a suitable open container or tank and heated to about 110° Fahrenheit. (By refined petroleum oil I mean crude petroleum oil from which all or practically all wax has been extracted.) I then add 18 gallons of lime water and agitate with a suitable mixing or stirring device for a period of 20 minutes, during which period the contents of the tank are gradually brought to a temperature of approximately 110° Fahrenheit. To this heated mixture is then added 8 gallons of resin oil which has been first heated to a temperature of 125° Fahrenheit. It is essential that the temperature of the resin oil be as stated (approximately 125° Fahrenheit) when added to the mixture, of petroleum oil and lime water. At the expiration of another mixing or stirring operation of 20 minutes 1½ gallons of graphite and 1½ gallons of wax are added preferably in the order named.

The lime water, preferably used in my admixture is prepared as follows: To 50 pounds of air slaked lime (hydrated preferred) add 25 gallons of water containing in solution 1 oz. of concentrated lye. After stirring for ten minutes draw off in a sluice lined with gunny cloth to remove all sediment and grit therefrom.

The preparation of resin oil is formed by adding to 100 pounds of resin 5 gallons of kerosene which is heated until the mass is melted when 3 gallons of red engine oil is mixed therewith. The temperature of the whole is then brought to approximately 125° Fahrenheit when it is ready for use.

The graphite used by me is prepared by adding to 50 pounds of graphite 2 gallons of red engine oil.

Red engine oil is the best petroleum oil, being the first oil drawn off at the refinery. After the kerosene, gasolene and paraffin are drawn off the petroleum is put into a refinery tank and the red engine oil is taken from the top after setting.

The preparation of wax is made by melting 50 pounds of wax in one gallon of kerosene. Before adding to the other ingredients this mixture should be brought to a temperature of approximately 125° Fahrenheit.

The foregoing ingredients when mixed in the quantities stated will make 400 pounds of lubricant, though it is of course understood any desired amount may be prepared, using the proportions set forth.

After the first two ingredients have been placed in the tank namely: the lime water and refined petroleum it is essential that the temperature of the contents of the tank be gradually raised from 110° Fahrenheit to approximately 160° while the resin oil, graphite and wax are being added or shortly thereafter.

In making up heavy black oils, for axle, gear or skid greases, the paraffin wax may be omitted and a low grade or crude petroleum oil substituted for the refined petroleum oil but in each instance the heating steps will be the same.

What I claim is:

1. The herein described lubricating compound consisting of refined petroleum oil 42 parts, lime water 36 parts, a mixture of resin, kerosene and red engine oil 16 parts, a mixture of graphite and red engine oil 3 parts and a mixture of paraffin wax and kerosene 3 parts.

2. The herein described method of making lubricating compounds consisting in heating a mixture of refined petroleum oil and lime water to approximately 110° Fahrenheit, adding thereto a mixture of resin, kerosene and red engine oil heated to a temperature of approximately 125° Fahrenheit, adding a mixture of graphite and red engine oil and then adding a mixture of paraffin wax and kerosene heated to a temperature of approximately 125° Fahrenheit, the temperature of the whole mixture being raised to between 125° and 160° Fahrenheit.

In testimony whereof I affix my signature in presence of two witnesses.

LYMAN DEE PETTIT.

Witnesses:
C. E. WILLIAMS,
W. R. STEVENS.